United States Patent [19]

Stansfield

[11] 3,973,668

[45] Aug. 10, 1976

[54] CONVEYOR FOR ARTICLES OF DIFFERENT SIZES

[75] Inventor: Stephen Raymond Stansfield, London, England

[73] Assignee: J. Lyons & Company Limited, London, England

[22] Filed: Oct. 31, 1974

[21] Appl. No.: 519,406

[30] Foreign Application Priority Data
Nov. 5, 1973  United Kingdom............... 51331/73

[52] U.S. Cl................................ 198/106; 198/131; 198/198; 198/199
[51] Int. Cl.²........................................ B65G 37/00
[58] Field of Search ............. 198/198, 199, 34, 131, 198/160, 106

[56] References Cited
UNITED STATES PATENTS

| | | | |
|---|---|---|---|
| 1,258,222 | 3/1918 | Jacobs et al. ....................... | 198/198 |
| 2,755,611 | 7/1956 | McGihon............................. | 198/34 |
| 2,792,603 | 5/1957 | Anderson........................... | 198/34 X |
| 3,057,456 | 10/1962 | Heinzer............................. | 198/34 X |

FOREIGN PATENTS OR APPLICATIONS 1,014,767  12/1965  United Kingdom.................. 198/34

Primary Examiner—Robert J. Spar
Assistant Examiner—James M. Slattery

[57] ABSTRACT

A conveyor comprises a conveying surface having a plurality of article locating elements. Each element is movable between an operative article locating position and an inoperative position. Moving mechanisms are provided for moving the article locating elements between their operative and inoperative positions above and below the conveying surface respectively. Such mechanisms are independently operable and each is arranged to move a different group of article locating elements whereby the conveyor can be used for conveying differently sized articles at different times by actuation of an appropriate moving mechanism.

12 Claims, 5 Drawing Figures

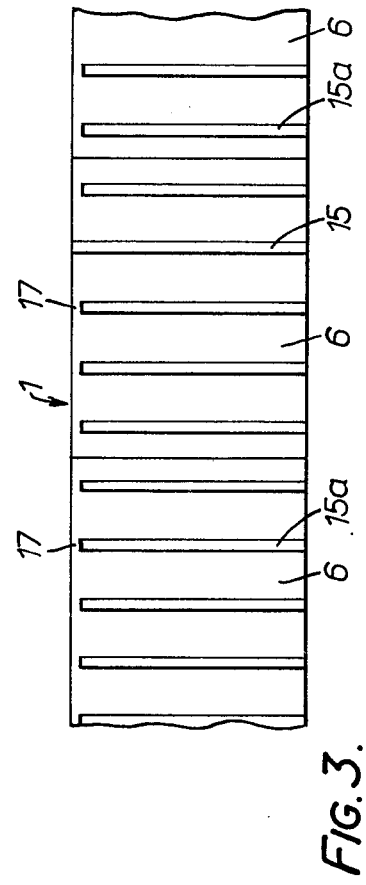
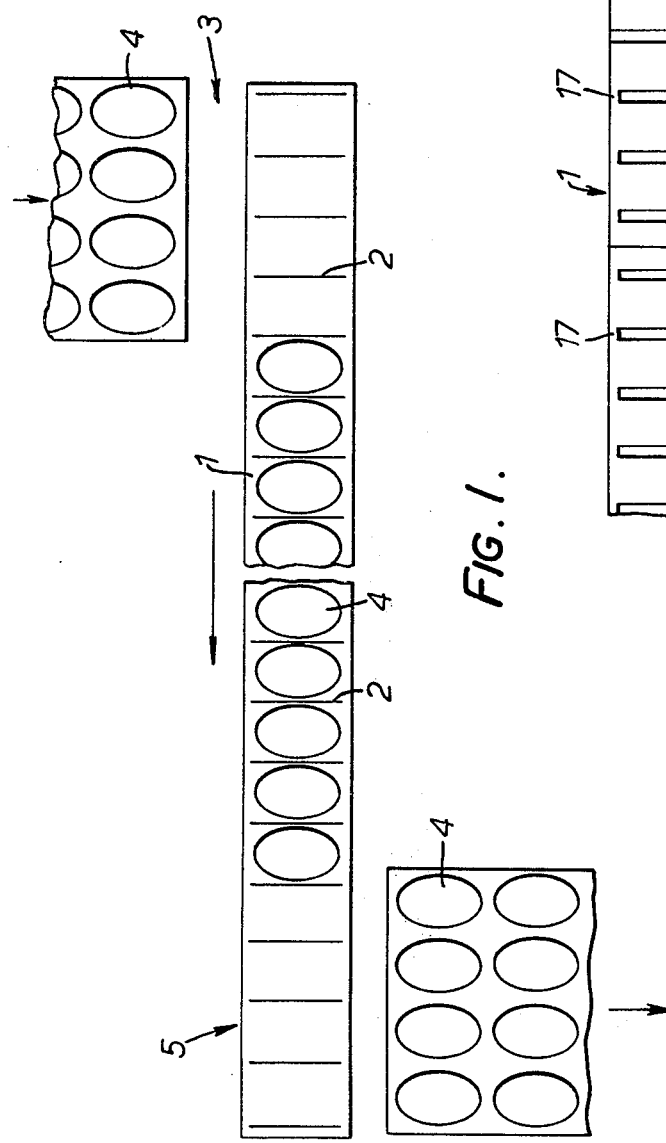
FIG. 1.
FIG. 3.

CONVEYOR FOR ARTICLES OF DIFFERENT SIZES

The present invention concerns improvements in and relating to conveyors.

In high speed production lines, for example, pie manufacturing lines producing 10,000 pies per hour, very high speed article handling equipment has to be used. It is found that intermittently moved conveyors used in such handling equipment in general need to be provided with article locating means, such as flight bars, to prevent the articles from moving relative to the conveying surface during acceleration and deceleration of the conveyor. If the size of the article of such a production line is changed, the conveyor has to be replaced by another one with article locating means suitably positioned for the new article size. This results in considerable loss of production time and indeed in shut-down of the production line.

According to the present invention there is provided a conveyor having a conveying surface, a plurality of article locating means, each movable between an operative article locating position and an inoperative position, and means for moving the article locating means between the operative and inoperative positions and including a plurality of independently operable moving means, each arranged to move a different group of article locating means, such that the conveyor can be used for conveying differently sized articles at different times by operating a different one of the moving means.

Preferably, the conveying surface is provided with apertures through which article locating means project, only some of the apertures receiving article locating means at any one time.

The article locating means may be flight bars having differently located projections for engagement by the different moving means.

The invention will be more fully understood from the following description of an embodiment thereof, given by way of example only, with reference to the accompanying drawings, in which:

FIG. 1 is a diagrammatic plan view of an embodiment of a conveyor according to the invention, in use;

FIG. 3 is a vertical section perpendicular to the conveying direction showing the conveying surface defining means of the conveyor of FIG. 1;

Figure 2:
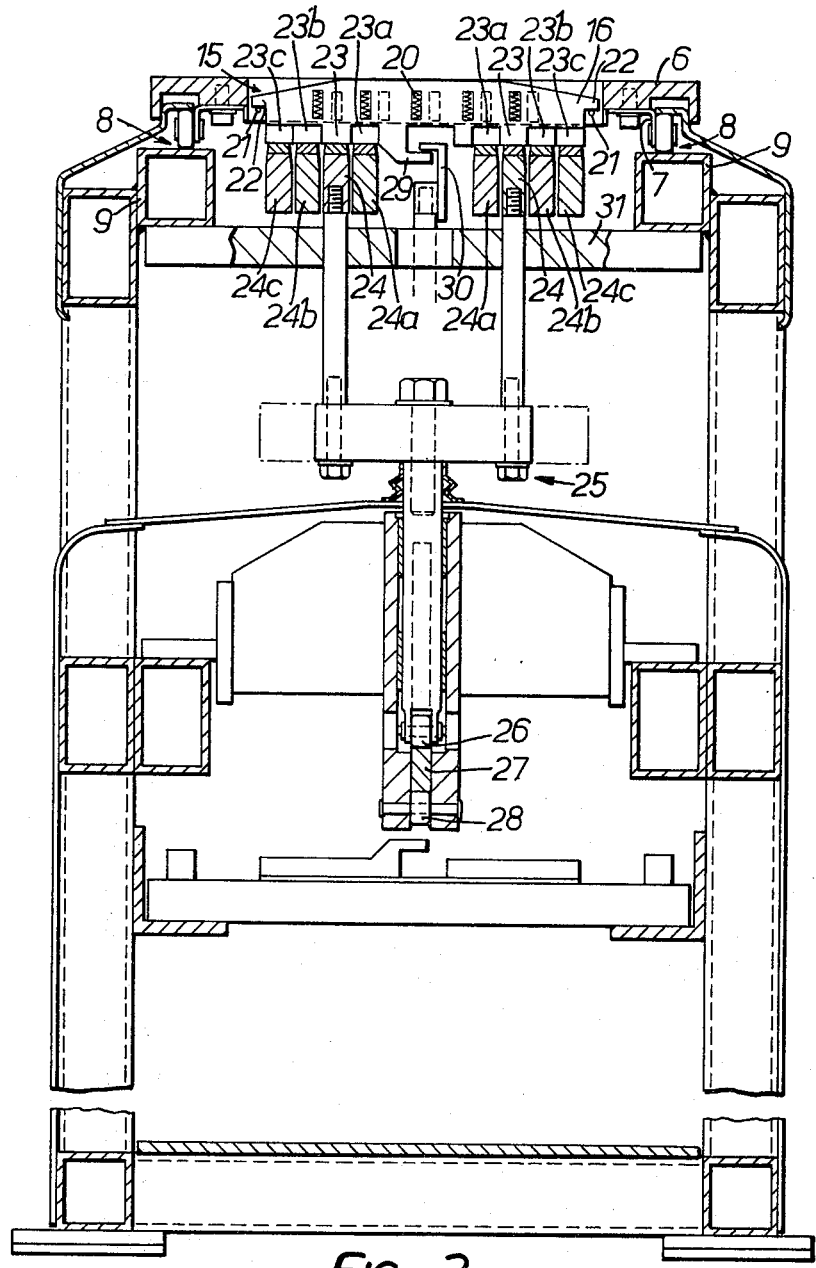
FIG. 2 is a vertical section perpendicular to the conveying direction of the conveyor of FIG. 1.

The conveyor shown in FIG. 1 comprises an endless conveying surface 1 provided with a plurality of flight bars 2, each of which is movable between an operative article locating position extending above the conveying surface and an inoperative position in which the flight bar does not project above the conveying surface and preferably has its upper edge flush with the conveying surface.

To allow the conveyor to be used to convey differently sized articles at different times, a plurality of mechanisms, equal to the number of differently sized articles to be conveyed, are provided for moving the flight bars between their operative and inoperative positions. The mechanisms act on different groups of the flight bars, the bars not being acted on at any one time remaining in their inoperative positions. For example, all of the flight bars which are provided may be arranged to be acted on by one mechanism, alternate ones of the flight bars may be arranged to be acted on by a second mechanism, every third one of the flight bars may be arranged to be acted on by a third mechanism, etc. Alternatively, the flight bars may be arranged so that none are common to the different groups of flight bars acted on by the different mechanisms. The particular arrangement selected, will, of course, depend on the differences in the sizes of the articles to be conveyed. In the preferred embodiment provision is made for flight bars at ¼ inch spacings so that the error between the size of an article to be conveyed and the spacing of adjacent flight bars is ± ⅛ inch.

In the preferred use of the conveyor, while the conveyor is stationary, the flight bars of the selected group of flight bars in the loading zone 3 are placed in their inoperative positions to allow handling equipment (not shown) to deposit articles 4 to be conveyed on the conveyor.

The flight bars of the selected group are then placed in their operative positions and the conveyor moved forward a sufficient distance to move the articles last placed thereon out of the loading zone. The conveyor is then halted, the bars in the loading zone are moved to their inoperative position and further articles 4 are deposited on the conveyor in the loading zone. A similar sequence is followed at the unloading zone 5. Intermediate the loading and unloading zones the bars of the selected group may be maintained in their operative positions or may be moved between the inoperative and operative positions with the flight bars in the loading and unloading zones.

Figure 4:
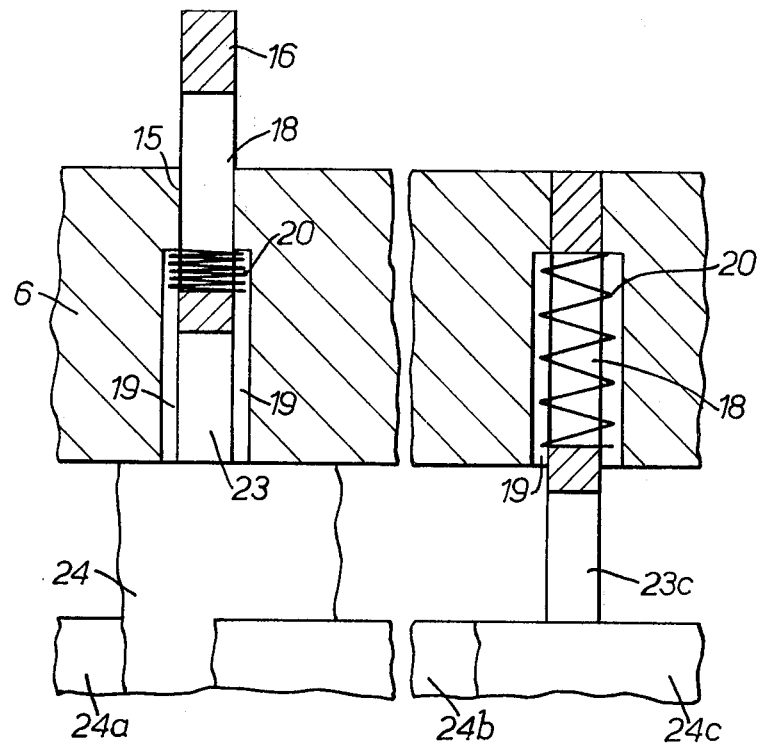
FIG. 4 is a vertical section perpendicular to the conveying direction showing details of the conveying surface and article locating means of the conveyor of FIG. 1.
Figure 5:
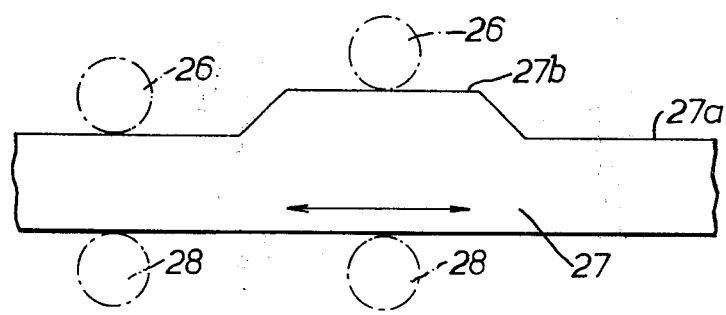
FIG. 5 is a side view of a cam forming part of a mechanism for moving the article locating means of the conveyor of FIG. 1.

In the preferred embodiment (FIGS. 2 to 5), the conveying surface 1 of the conveyor is formed by a plurality of blocks 6 extending transversely of the conveying direction and positioned side by side. The blocks are mounted at each end on plates 7, each carried by an endless roller chain. In the upper run of the conveyor, the rollers 8 of the roller chains run on the surfaces of fixed side frame members 9.

At least some of the blocks 6 are formed with at least one slot 15 in which a flight bar 16 is received. As shown in FIG. 3, each block 6 is formed e.g. at ¼ inch spacings, with a plurality of blind slots 15a dimensioned to receive flight bars and which can be opened as required to receive a flight bar, by removing a thin membrane 17 closing the slot at the conveying surface 1.

Each flight bar 16 is formed with a series of spaced openings 18 (FIG. 4) in register with openings 19 in the sides of the slot 15 in which the bar is received, a spring 20 being received in the openings 18, 19 and acting between the upper surfaces of the openings 19 and the lower surface of the opening 18 to bias the bar 16 downwardly. The bar 16 is inserted into its slot 15 from below the block 6 and held therein by pins 21 inserted through the block and against which projection 22 on the bar bear when the bar is in its inoperative position.

Each bar 16 is moved up and down between its operative and inoperative positions by one of a plurality of independently operable mechanisms each including a cam. The flight bars of one group are each provided with a pair of transversely spaced apart downwardly extending projections 23 whose lower surfaces rest on the upper surfaces of bars 24 extending in the conveying direction. The bars 24 are supported by a plurality of identical support linkages 25 each of which carries at its lower end a cam follower 26 in the form of a roller which runs on a shaped cam surface of a cam 27. The lower surface of the cam 27 runs on a complimentary roller 28 having a relatively fixed axis and supported by the frame of the conveyor. The cam includes cam surfaces 27a (FIG. 5) and 27b and is reciprocated in the direction of the arrow by any suitable means (not shown) to raise and lower the flight bars of the group. When the roller 26 is on the surface 27a the flight bars are retracted and when the roller 26 is on the surface 27b the flight bars are in their operative positions. The extent of projection of the flight bars above the conveying surface 1 depends on the vertical distance between the surfaces 27a and 27b, which can be varied as required. The bars 24 may extend the full length of the upper run of the conveying surface so that all the flight bars provided with projections 23 are moved simultaneously. Alternatively, bars 24 may be provided only at the loading and unloading zones and intermediate these zones further bars similar to bars 24 may be provided which are moved at the beginning of operation by movement of a cam similar to cam 27 to a position maintaining the flight bars provided with projections 23 in their operative positions.

The support linkages 25, associated members are spaced apart in the conveying direction so as to provide the bars 24 with sufficient support to maintain their linearity.

To ensure that the flight bars 16 are retracted when the roller 26 returns from surface 27b to surface 27a of the cam, the underside of each flight bar is provided with a hook member 29 engaged by a complimentary shaped hook member 30 which extends in the conveying direction and is coextensive with the bars 24. The member 30 is supported by one or more linkages and reciprocated by a cam arrangement in exactly the same way as the bars 24 and moves with the bars 24. However, a spring (not shown) is provided acting against the underside frame member 31 and the upper surface of a part of each of the support linkages of the member 30 to bias the member 30 and consequently the member 29 and flight bar downwardly.

In the preferred embodiment four mechanisms as above described, for moving different groups of the flight bars 16 between operative and inoperative positions, are provided, each having a pair of bars 24, 24a, 24b, 24c, the bars of each pair being spaced apart transversely of the conveying direction. The flight bars 16 are provided with one or more projections 23, 23a, 23b, 23c positioned in register with the appropriate bars 24, 24a, 24b, 24c. It will be appreciated that the flight bars bearing projections 23 form one group, those bearing projections 23a form a second group etc., to be operated by the different mechanisms.

If desired, the conveyor may be provided with lateral guides, adjustable transversely of the conveying surface.

In the preferred embodiment for conveying food products, the blocks 6 and flight bars 16 are made of food grade plastics material and the bars 24 are made of metal provided with a plastics surface layer on which the flight bar projections bear.

In a modification of the above described conveyor, each flight bar is replaced by a plurality of discrete elements, e.g. pins, spaced transversely of the conveying direction. Additionally, further such elements may be provided spaced apart in the conveying direction to define "cages" for articles to be conveyed. Groups of these elements are arranged to be operated by different mechanisms to permit the conveyor to be used at different times for different articles.

It will be appreciated, that, while the invention has been described in connection with a conveyor suitable for conveying four different sizes of articles at different times, two, three or more than four such mechanisms for moving different groups of flight bars may be provided.

What I claim is:

1. A conveyor comprising a movable conveying surface, a plurality of article locating means for movement with the conveying surface, each movable relative to the conveying surface between an operative article locating position projecting from the surface and a retracted inoperative position, the intervals between said article locating means in both the operative positions and the inoperative positions as measured along the length of the conveyor movement axis being fixed in the normal course of apparatus use, and means for moving the article locating means between their operative and inoperative positions, and including a plurality of independently operable moving means, each arranged to move a different group of article locating means, each group comprising a plurality of article locating means, such that the conveyor can be used for conveying differently sized articles at different times by operating a different one of the moving means.

2. A conveyor according to claim 1, wherein each article locating means is biassed to its inoperative position.

3. A conveyor according to claim 1, wherein each article locating means is movable through aperture means in the conveying surface to project above the surface in its operative position.

4. A conveyor according to claim 3, wherein the conveying surface is defined by a surface of each of a plurality of blocks arranged side-by-side and extending transversely of the conveying direction, a plurality of slots being formed in the blocks at least some of which form said aperture means and receive article locating means.

5. A conveyor according to claim 4, wherein the blocks are coupled together by driving means.

6. A conveyor according to claim 3, wherein the article locating means are bars extending transversely of the conveying direction.

7. A conveyor according to claim 3, wherein each article locating means comprises a plurality of elements spaced apart in a direction transverse to the conveying direction.

8. A conveyor according to claim 3, wherein the article locating means includes elements extending in the conveying direction.

9. A conveyor according to claim 1, wherein each independently operable moving means includes a moving member extending beneath the conveying surface and movable between an inoperative position and an operative position in which it engages the article locating means of the associated group of article locating means and holds them in their operative positions.

10. A conveyor according to claim 9, wherein movement of each moving member is controlled by a cam means.

11. A conveyor according to claim 9, wherein the moving members are spaced apart transversely of the conveying direction and the article locating means have projections for engaging the respective moving member.

12. A conveyor according to claim 1, wherein at least some of the article locating means are common to more than one group of article locating means.

* * * * *